June 6, 1967 Y. M. HOAG 3,323,738

TAPE RECORDER MECHANISM

Filed July 12, 1965

INVENTOR:
YATES M. HOAG,

BY Norman C. Fulmer
HIS ATTORNEY.

United States Patent Office 3,323,738
Patented June 6, 1967

3,323,738
TAPE RECORDER MECHANISM

Yates M. Hoag, Utica, N.Y., assignor to General Electric Company, a corporation of New York
Filed July 12, 1965, Ser. No. 471,187
6 Claims. (Cl. 242—55.12)

Figure 1:
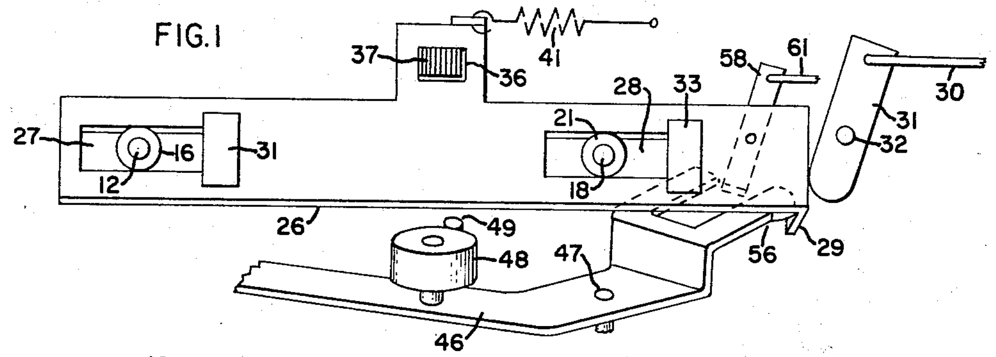

This invention relates to tape recorder mechanisms, and particularly to such mechanisms which perform various functions including selectively applying brakes to stop rotation of the tape reels. The invention also relates to mechanisms for controlling the movement of a pinch wheel with respect to a capstan drive shaft.

Tape recorders generally are arranged to perform the functions of recording, playback, and rewind. A "stop" function also is provided. These functions are selectively actuated by means of push buttons, knobs, or levers. In the "stop" condition it is desirable to apply brakes to quickly stop rotation of the tape reels and to hold the reels against accidental rotation. In capstan-drive tape recorders it is also desirable, in the "stop" condition, to have the pinch wheel move away from the capstan so that the magnetic tape can be removed from, or inserted, between the capstan and pinch wheel. For the "record" and "playback" functions, the brakes are released and the pinch wheel urges the tape against the capstan. For the "rewind" function the brakes are released and the pinch wheel is moved away from the capstan. Various arrangements have been devised for achieving these various conditions and movements of parts in order that tape recorders can perform their various functions. These previous arrangements have been characterized by varying degrees of complexity, cost, and performance capabilities.

An object of the invention is to provide an improved mechanism for tape recorders.

Another object is to provide a tape recorder mechanism which is relatively simple and inexpensive, and which performs the desired functions reliably and effectively.

Further objects will be apparent from the following description and claims, and from the accompanying drawing.

The tape recorder mechanism of the invention comprises, briefly and in a preferred embodiment, an elongated brake plate provided with a pair of elongated slots which fit respectively over a supply reel shaft and a take-up reel shaft of the tape recorder so that the brake plate is slidable a limited distance along the axis extending between the supply reel shaft and the take-up reel shaft. Reel hubs are respectively journaled on the supply reel shaft and the take-up reel shaft. A pair of brake pads are carried by the sliding brake plate and respectively bear against these reel hubs in braking engagement therewith to stop rotation thereof when the brake plate is moved in one direction (i.e. when the tape recorder is in the "stop" condition), and these brake pads move away from the hub when the brake plate is moved in the opposite direction. In a further aspect of the invention, the brake plate is provided with means for engaging a pinch wheel arm for moving a pinch wheel away from a tape-driving capstan whenever the brake plate is in its braking position. Further means are provided, independently of the brake plate, for engaging the pinch wheel arm to move the pinch wheel away from the capstan when the tape recorder is in the "rewind" condition.

Figure 2:
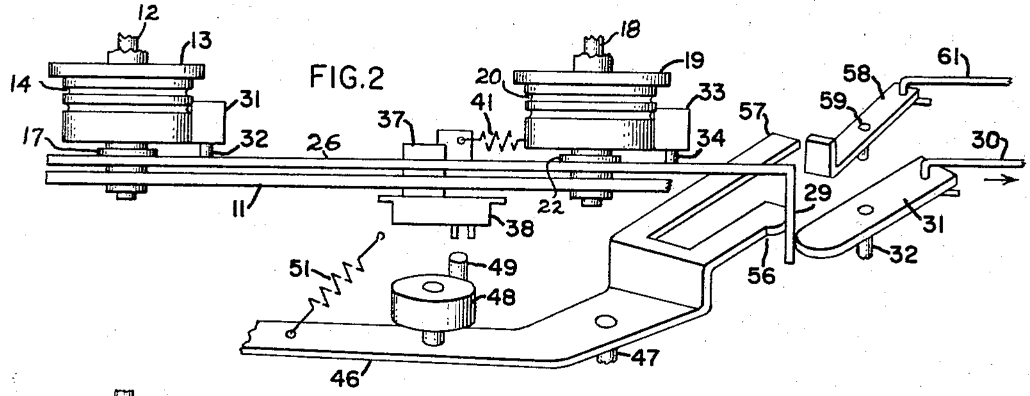
Figure 3:
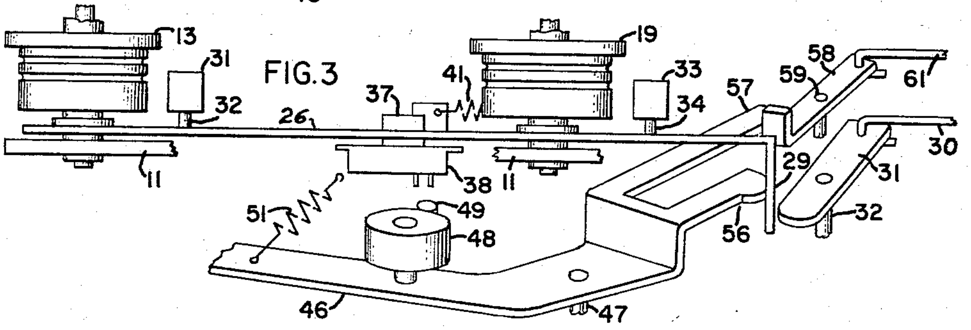
Figure 4:
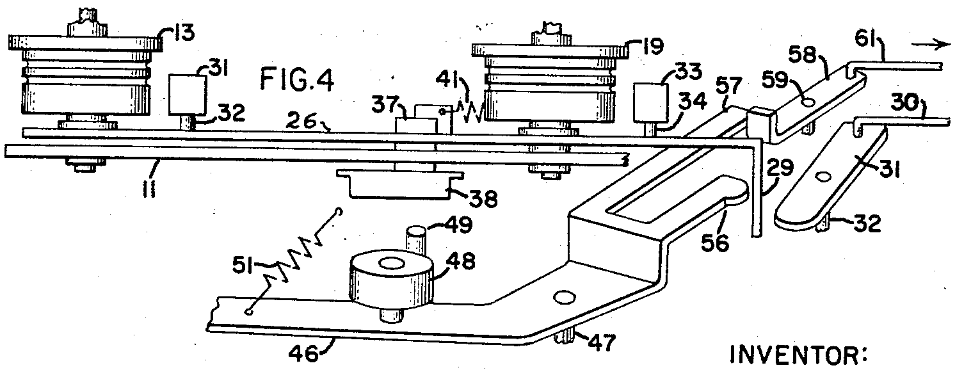

In the drawing:

FIG. 1 is a perspective view of a portion of the invention in accordance with a preferred embodiment thereof, the mechanism being shown in the condition for playing and recording, FIG. 2 is a combined perspective and side view of the mechanism in the "stop" condition, FIG. 3 is a combined perspective and side view of the mechanism in the condition for "play" and "record," and FIG. 4 is a combined perspective and side view of the mechanism in the "rewind" condition.

Now referring to the drawing, a preferred embodiment of the invention comprises a housing or base plate 11 which carries a shaft 12 extending upwardly therefrom. This shaft 12 may be either rotatably or non-rotatably attached to the base plate 11. A supply reel hub 13 is rotatably mounted on the shaft 12, and is adapted to carry a tape supply reel on or at the upper surface thereof. The lower portion of the shaft 12 is provided with an enlarged shoulder 16 near the base plate 11, and a flange 17 is provided at the upper end of the shoulder 16. Another shaft 18 is carried by the base plate 11 and extends upwardly therefrom, in a manner similar to the shaft 12. A take-up reel hub 19 is rotatably positioned on the shaft 18, and is adapted to carry a tape take-up reel at the upper surface thereof. An enlarged shoulder 21 is provided at the lower end of the shaft 18 near the base plate 11, and an enlarged flange 22 is provided at the upper end of the shoulder 21, as shown.

An elongated flat brake plate 26 is provided with elongated openings 27 and 28 respectively adapted to fit over and around the shoulders 16 and 21, so as to permit sliding motion of the brake plate 26 along an axis extending between the reel shafts 12 and 18.

A belt (not shown) is positioned in a groove 14 of the supply reel hub 13 and is adapted to rotate this hub during the "rewind" function of the tape recorder. Another belt (not shown) is positioned in a groove 20 of the take-up reel hub 19, and is adapted to rotate this hub in a suitable manner during the "play" and "record" functions of the tape recorder.

The brake plate 26 is shaped so that it has a shoulder which projects down at an end thereof as indicated by the numeral 29.

A brake pad 31 is carried by an upwardly extending member 32 of the brake plate 26, and a second brake pad 33 is carried by another upwardly extending member 34 of the brake plate 26. The upwardly extending portions 32 and 34 may be obtained from sections of the brake plate formed when the slots 27 and 28 are struck out in the brake plate 26. The brake pads 31 and 33 are made from resilient material, such as rubber, and are positioned on the brake plate 26 so that when the brake plate 26 is caused to slide toward the left, the brake pads 31 and 33 approximately simultaneously engage against the surfaces of the hubs 13 and 19, so as to stop rotation of these hubs quickly and to hold these hubs against rotation, when the mechanism is in the "stop" condition as illustrated in FIG. 2. Any final adjustment of the brakes is readily achieved by slightly bending one of the upwardly extending members 32, 34. The brake plate 26 is caused to move to the left, i.e. into braking condition, by means of a linkage wire 30 which is coupled to a push-button or other suitable actuating means (not shown) which turns an arm 31 pivoted on a pivot 32, so that the other end of this arm 31 forces against the shoulder 29 of the brake plate 26, thereby moving the brake plate to the left and into the braking position as shown in FIG. 2.

The brake plate 26 is provided with an opening 36 which fits around the slide button 37 of an on-off switch 38 for the tape recorder motor, so that when the brake plate is in a "stop" position as shown in FIG. 2, the switch 38 turns off the tape recorder motor, whereas in the functional conditions shown in the other three figures of the drawing the switch 38 is actuated by the brake plate to turn the tape recorder motor on. A tension spring 41 urges the brake plate 26 to the right, and actuation of the stop arm 31 overcomes the tension of this spring so as to force the brake plate to the "stop" position as shown in FIG. 2.

A pinch-wheel arm 46 is pivoted at 47 and carries a pinch wheel 48 rotatably mounted thereon at a location so that the arm 46 can swing the pinch wheel 48 toward a rotating tape-drive capstan shaft 49 which is driven from the tape recorder motor (not shown), whereby the pinch wheel 48 pinches the recording tape (not shown) between the pinch wheel 48 and the capstan 49 so that the tape will be driven by the capstan in the well-known manner.

The pinch-wheel arm 46 is provided with a rounded shoulder 56 at an end at the other side of the brake plate shoulder 29 from the stop arm 31, so that when the stop arm 31 moves the brake plate towards the left into braking position, the brake plate shoulder 29 engages against the pinch arm shoulder 56 so as to swing the pinch arm 46 in a manner to move the pinch wheel 48 away from the capstan 49 and out of engagement with the capstan or the tape positioned between the capstan 49 and the pinch wheel 48. This permits tape to easily be removed from, or inserted between, the capstan 49 and pinch wheel 48 when the tape recorder is in the "stop" condition. A tension spring 51 urges the pinch wheel arm 46 in a direction for causing the pinch wheel 48 to resiliently engage against the capstan 49, or against a tape positioned between the capstan 49 and pinch wheel 48, at times except when the tension of the spring is overcome by mechanisms for forcing the pinch wheel 48 away from the capstan 49.

A portion 57 of the pinch-wheel arm 46, at or near the aforesaid part 56, is adapted to be selectively engaged by a "rewind" arm 58 which is pivoted at 59 and which is caused to swing by means of a wire linkage 61 which is adapted to be actuated by means of a "rewind" button or other selective manual means. When this rewind linkage 61 is forced toward the right, it swings the arm 58 so as to engage against the pinch-wheel arm projection 57 and swing the arm 46 so as to move the pinch wheel 48 away form the capstan 49 during the "rewind" operation, so that when the hub 13 is caused to rotate thereby rotating the supply reel to wind up the tape on it, the tape can freely pass between the capstan 49 and pinch wheel 48.

FIGS. 2, 3, and 4 of the drawing are shown partly in side view and partly in perspective in order to give a clear showing of how the parts are arranged, and, although the parts could be arranged as shown, preferably the base plate 11, the brake plate 26, the pinch-wheel arm 46, and the actuating arms 31 and 58 lie in parallel planes, and the pinch-wheel arm pivot 47 and actuating arm pivots 32 and 59 are all carried by the base plate 11. In the perspective view of FIG. 1, the reel hubs 13 and 19 are omitted in order to give a clear showing of how the brake plate slots 27 and 28 fit onto the shafts shoulders 16 and 21.

The mechanism of the invention functions as follows. When it is desired to place the tape recorder in the "stop" condition, the "stop" button or other means is actuated, thereby moving the wire 30 so as to swing the arm 31 to engage against the brake plate shoulder 29, thereby moving the brake plate 26 towards the left, thereby turning off the motor switch 38 to stop driving of the reel hubs 13 and 19, and also bringing the brake pads 31 and 33 into resilient engagement against the hubs 13 and 19 to quickly stop rotation thereof and to prevent accidental rotation thereof when the mechanism is in the "stop" condition. Also, when the brake plate 26 is moved to the "stop" condition, the shoulder 29 thereof engages against the shoulder 56 of the pinch-wheel arm 46, so as to swing the pinch wheel 48 away from the capstan 49 so that tape may easily be inserted between or removed from between the capstan 49 and pinch wheel 48.

To place the mechanism is the "play" or "record" condition, the arm mechanism 31 is released so that the spring 41 urges the brake plate toward the right whereby the brake pads 31 and 33 move out of engagement with the hubs 13 and 19, and the pinch wheel 48 is urged toward the capstan 49 by the spring 51, and the switch 38 is placed in the "on" condition to turn on the motor to rotate the capstan 49 to drive the tape past the usual magnetic heads.

To rewind tape onto the supply reel, the wire linkage 61 is actuated by means of a push button or other suitable means, to swing the arm 58 to force against the shoulder 57 of the pinch wheel arm 46, thereby urging the pinch wheel 48 away from the capstan 49. Other means (not shown), such as disclosed in co-pending patent application Ser. No. 466,261, may be employed for causing rotation of the hub 13 for rewinding the tape.

The above-described arrangement of the invention achieves the objects of providing an improved tape recorder mechanism which is relatively simple, inexpensive, and which performs the various desired tape recorder functions reliably and effectively.

While a preferred embodiment of the invention has been shown and described, various other embodiments and modifications thereof will be apparent to those skilled in the art and will fall within the scope of invention as defined in the following claims.

What I claim is:

1. A tape recorder mechanism comprising a supply reel shaft, a supply reel hub carried by said supply reel shaft, a take-up reel shaft spaced from and parallel to said supply reel shaft, a take-up reel hub carried by said take-up reel shaft, an elongated brake plate provided with a pair of elongated slots and positioned with said slots respectively over said shafts to render said brake plate slidable along the axis extending between said shafts, said brake plate being provided with a pair of brake pads respectively adjacent to said hubs and adapted to bear against said hubs in braking engagement therewith when said brake plate is caused to slide in one direction and adapted to disengage from said hubs when said brake plate is caused to slide in the other direction, and means for selectively sliding said brake plate in said directions for selectively braking said hubs.

2. A mechanism as claimed in claim 1, including a base plate which carries said shafts, each of said shafts being provided with a flange spaced from said base plate a distance slightly greater than the thickness of said brake plate, said brake plate being positioned between said base plate and said flanges.

3. A mechanism as claimed in claim 1, in which said brake plate is provided with a pair of laterally extending arms respectively struck out from said elongated slots, said brake pads being respectively carried by said laterally extending arms.

4. A mechanism as claimed in claim 1, including a motor switch, said brake plate being provided with means for engaging said switch to turn it to the "off" condition when the brake plate is in the braking position.

5. A mechanism as claimed in claim 1, including a capstan, and a pinch-wheel arm carrying a pinch wheel and pivotally mounted for swinging said pinch-wheel toward and away from said capstan, said brake plate being provided with means for engaging said pinch-wheel arm to swing said pinch-wheel away from said capstan when said brake plate is in braking position.

6. A mechanism is claimed in claim 5, in which said brake plate is provided with a laterally extending shoulder, and including a brake arm adapted to bear against a face of said shoulder to force said brake plate into braking position, said pinch-wheel arm being adapted to be engaged by the other face of said shoulder for swinging the pinch wheel away from the capstan when the brake plate is forced into braking position.

References Cited

UNITED STATES PATENTS

| | | | |
|---|---|---|---|
| 2,438,222 | 3/1948 | Lear | 179—100.2 |
| 2,912,514 | 11/1959 | Lowry | 179—100.2 |
| 3,130,935 | 4/1964 | Aldridge | 242—55.12 |

LEONARD D. CHRISTIAN, *Primary Examiner.*